(12) United States Patent
Nazri

(10) Patent No.: US 9,281,515 B2
(45) Date of Patent: Mar. 8, 2016

(54) LITHIUM BATTERY WITH SILICON-BASED ANODE AND SILICATE-BASED CATHODE

(76) Inventor: Gholam-Abbas Nazri, Bloomfield Hills, MI (US)

( * ) Notice: Subject to any disclaimer, the term of this patent is extended or adjusted under 35 U.S.C. 154(b) by 418 days.

(21) Appl. No.: 13/613,824

(22) Filed: Sep. 13, 2012
(Under 37 CFR 1.47)

(65) Prior Publication Data
US 2013/0234674 A1   Sep. 12, 2013

Related U.S. Application Data

(60) Provisional application No. 61/450,401, filed on Mar. 8, 2011, provisional application No. 61/450,411, filed on Mar. 8, 2011, provisional application No. 61/608,262, filed on Mar. 8, 2012.

(51) Int. Cl.
| | |
|---|---|
| *H01M 4/13* | (2010.01) |
| *H01M 4/134* | (2010.01) |
| *H01M 4/136* | (2010.01) |
| *H01M 4/139* | (2010.01) |
| *H01M 4/58* | (2010.01) |
| *H01M 4/583* | (2010.01) |
| *H01M 10/0525* | (2010.01) |

(52) U.S. Cl.
CPC .............. *H01M 4/134* (2013.01); *H01M 4/136* (2013.01); *H01M 4/139* (2013.01); *H01M 4/583* (2013.01); *H01M 4/5825* (2013.01); *H01M 10/0525* (2013.01); *Y02E 60/122* (2013.01); *Y10T 29/49108* (2015.01)

(58) Field of Classification Search
CPC .................................................... Y02E 60/122
USPC .................. 429/94, 144, 156, 211, 220–221, 429/231.95, 246, 306, 403, 406, 209, 231.8, 429/252, 477
See application file for complete search history.

(56) References Cited

U.S. PATENT DOCUMENTS

| | | |
|---|---|---|
| 3,330,697 A | 7/1967 | Pechini |
| 4,226,636 A | 10/1980 | Mizutani et al. |
| 4,234,380 A | 11/1980 | Kihlstedt et al. |
| 4,391,787 A | 7/1983 | Tibbetts |

(Continued)

FOREIGN PATENT DOCUMENTS

| | | |
|---|---|---|
| CN | 1534813 A | 10/2004 |
| CN | 1812934 A | 8/2006 |

(Continued)

OTHER PUBLICATIONS

U.S. Appl. No. 13/409,709, filed Mar. 1, 2012, Nazri.

(Continued)

*Primary Examiner* — Paul Dinh
(74) *Attorney, Agent, or Firm* — Harness, Dickey & Pierce, P.L.C.

(57) ABSTRACT

A lithium-ion battery is provided and related methods. The lithium-ion battery includes an electrode comprising an Olivine flake-like structure and an electrode comprising a plurality of coated carbon nanofibers. The Olivine flake-like structures form clusters through which the lithium ions are transported while reducing initial cycle irreversibility. The electrode comprising the coated carbon nanofibers additionally reduce initial cycle irreversibility by controlling expansion of the substrate forming the electrode comprising the coated carbon nanofibers.

20 Claims, 10 Drawing Sheets

(56) References Cited

U.S. PATENT DOCUMENTS

| | | | |
|---|---|---|---|
| 4,491,569 | A | 1/1985 | Tibbetts |
| 4,497,788 | A | 2/1985 | Bradley et al. |
| 4,565,684 | A | 1/1986 | Tibbetts et al. |
| 5,024,818 | A | 6/1991 | Tibbetts et al. |
| 5,374,415 | A | 12/1994 | Alig et al. |
| 5,389,400 | A | 2/1995 | Ting et al. |
| 5,413,773 | A | 5/1995 | Tibbetts et al. |
| 5,424,126 | A | 6/1995 | Tibbetts et al. |
| 5,433,906 | A | 7/1995 | Dasch et al. |
| 5,587,257 | A | 12/1996 | Tibbetts et al. |
| 5,594,060 | A | 1/1997 | Alig et al. |
| 5,604,037 | A | 2/1997 | Ting et al. |
| 5,814,408 | A | 9/1998 | Ting et al. |
| 5,837,081 | A | 11/1998 | Ting et al. |
| 5,846,509 | A | 12/1998 | Alig et al. |
| 5,853,865 | A | 12/1998 | McHugh et al. |
| 6,156,256 | A | 12/2000 | Kennel |
| 6,506,355 | B1 | 1/2003 | Glasgow et al. |
| 6,506,865 | B2 | 1/2003 | Kwag et al. |
| 6,630,015 | B1 | 10/2003 | Burton et al. |
| 6,988,304 | B2 | 1/2006 | Moseley et al. |
| 7,018,607 | B2 | 3/2006 | Nazri et al. |
| 7,297,446 | B2 | 11/2007 | Fukui et al. |
| 8,048,341 | B2 | 11/2011 | Burton et al. |
| 8,148,455 | B2 | 4/2012 | Posudievsky et al. |
| 8,586,222 | B2 | 11/2013 | Timmons et al. |
| 8,663,840 | B2 | 3/2014 | Nazri et al. |
| 8,785,054 | B2 | 7/2014 | Halalay et al. |
| 2003/0015705 | A1* | 1/2003 | Chason et al. ............ 257/72 |
| 2003/0219646 | A1* | 11/2003 | LeCostaouec ............ 429/44 |
| 2004/0191631 | A1 | 9/2004 | Fukui et al. |
| 2004/0265216 | A1 | 12/2004 | Nazri et al. |
| 2008/0261116 | A1 | 10/2008 | Burton et al. |
| 2009/0047577 | A1* | 2/2009 | Iwamoto et al. ........ 429/218.1 |
| 2009/0117471 | A1 | 5/2009 | Grey et al. |
| 2009/0148769 | A1* | 6/2009 | Volkov et al. ............ 429/209 |
| 2009/0294736 | A1 | 12/2009 | Burton et al. |
| 2010/0055465 | A1 | 3/2010 | Palmer et al. |
| 2010/0119939 | A1* | 5/2010 | Misumi et al. ............ 429/212 |
| 2010/0140540 | A1 | 6/2010 | Yamada et al. |
| 2010/0181529 | A1 | 7/2010 | Huang et al. |
| 2010/0189991 | A1* | 7/2010 | Lytle et al. ............ 428/315.5 |
| 2010/0255356 | A1 | 10/2010 | Fujii et al. |
| 2010/0330419 | A1 | 12/2010 | Cui et al. |
| 2010/0330425 | A1* | 12/2010 | Lopatin et al. ............ 429/220 |
| 2010/0330430 | A1 | 12/2010 | Chung et al. |
| 2011/0008678 | A1 | 1/2011 | Li et al. |
| 2011/0051322 | A1* | 3/2011 | Pushparaj et al. ............ 361/525 |
| 2011/0052985 | A1 | 3/2011 | Kashiwazaki et al. |
| 2011/0068295 | A1 | 3/2011 | Beck et al. |
| 2011/0076596 | A1* | 3/2011 | Futami et al. ............ 429/514 |
| 2011/0151333 | A1 | 6/2011 | Halalay et al. |
| 2011/0250478 | A1 | 10/2011 | Timmons et al. |
| 2011/0274976 | A1 | 11/2011 | Blomgren et al. |
| 2011/0291055 | A1 | 12/2011 | Kojima et al. |
| 2012/0219852 | A1 | 8/2012 | Huang et al. |
| 2012/0227252 | A1 | 9/2012 | Nazri |
| 2012/0229096 | A1 | 9/2012 | Nazri |
| 2012/0264017 | A1 | 10/2012 | Nazri et al. |
| 2012/0264020 | A1 | 10/2012 | Burton et al. |

FOREIGN PATENT DOCUMENTS

| | | |
|---|---|---|
| CN | 101327920 A | 12/2008 |
| CN | 101562244 A | 10/2009 |
| CN | 101604745 A | 12/2009 |
| CN | 102214817 A | 10/2011 |
| CN | 102738448 A | 10/2012 |
| WO | 2010089931 A1 | 8/2010 |

OTHER PUBLICATIONS

U.S. Appl. No. 13/409,732, filed Mar. 1, 2012, Nazri.

J. Phys. Chem. C. 2009, 113, pp. 4712-4716, Synthesis and Electrochemical Performance of Sulfur/Highly Porous Carbon Composites, C. Lai, X. P. Gao, B. Zhang, T.Y. Yan, and Z. Zhou, published online Feb. 20, 2009.

Chinese Chemical Letters 20 (2009) pp. 1255-1258, Electrochemical performance of sulfur composite cathode materials for rechargeable lithium batteries, Feng Wu, Sheng Xian Wu, Ren Jie Chen, Shi Chen, and Guo Qing Wang.

Journal of Alloys and Compounds 449 (2008) pp. 313-316, Improvement of cycle property of sulfur electrode for lithium/sulfur battery, Young-Jin Choi, Ki-Won Kim, Hyo-Jun Ahn, Jou-Hyeon Ahn, available online Jan. 24, 2007.

Nature Materials 8 (2009) pp. 500-506, A highly ordered nanostructured carbon—sulphur cathode for lithium—sulphur batteries, Xiulei Ji, Kyu Tae Lee, and Linda F. Nazar, published online May 17, 2009.

Journal of Power Sources 195 (2010) pp. 2928-2934, Preparation of electrochemically active lithium sulfide-carbon composites using spark-plasma-sintering process, Tomonari Takeuchi, Hikari Sakaebe, Hiroyuki Kageyama, Hiroshi Senoh, Tetsuo Sakai, and Kuniaki Tatsumi, available Nov. 10, 2009.

Chem. Mater. 21, 2009, pp. 4724-4730, Hierarchically Structured Sulfur/Carbon Nanocomposite Material for High-Energy Lithium Battery, Chengdu Liang, Nancy J. Dudney, and Jane Y. Howe, published online Sep. 4, 2009.

Journal of Power Sources 195 (2010) 3684-3688, A high energy density lithium/sulfur—oxygen hybrid battery, Sheng S. Zhang, Donald Foster, and Jeffrey Read, available online Dec. 22, 2009.

Electrochimica Acta 52 (2007) pp. 2829-2840, Characterization of silicon- and carbon-based composite anodes for lithium-ion batteries, Volodymyr G. Khomenko, and Viacheslav Z. Barsukov, available online Nov. 30, 2006.

Journal of Power Sources 125 (2004) pp. 206-213, Electrochemical performance of lithium ion battery, nano-silicon-based, disordered carbon composite anodes with different microstructures, Xiang-Wu Zhang, Prashanth K. Patil, Chunsheng Wang, A. John Appleby, Frank E. Little, and David L. Cocke.

Journal of Power Sources 174 (2007) pp. 823-827, Spray-pyrolyzed silicon/disordered carbon nanocomposites for lithium-ion battery anodes, S.H. Ng, J. Wang, K. Konstantinov, D. Wexler, S.Y. Chew, Z.P. Guo, and H.K. Liu, available online Jun. 29, 2007.

Nyten et al., Electrochemical Performance of Li2FeSiO4 as a New Li-Battery Cathode Material, Electrochemistry Communication 7 (2005) 156-160.

Gömez-Cämer et al., Anchoring Si nanoparticles to carbon nanofibers: an efficient procedure for improving Si performance in Li batteries, Nov. 2010, Journal of Materials Chemistry, 21, 811-818.

* cited by examiner

LITHIUM BATTERY WITH SILICON-BASED ANODE AND SILICATE-BASED CATHODE

CROSS-REFERENCE TO RELATED APPLICATIONS

This application claims the benefit of U.S. Provisional Application No. 61/608,262, filed on Mar. 8, 2012. The disclosure of the above application is incorporated herein by reference in its entirety.

This application claims the benefit of U.S. Ser. No. 13/409,732 filed Mar. 1, 2012, which claims priority to U.S. Provisional Application No. 61/450,401, filed on Mar. 8, 2011; and U.S. Ser. No. 13/409,709 filed Mar. 1, 2012, which claims priority to U.S. Provisional 61/450,411, filed on Mar. 8, 2011. The entire disclosures of each of the above applications are incorporated herein by reference.

FIELD

The present disclosure relates to lithium batteries having a silicon-based anode and a silicate-based cathode.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The selection of battery materials includes considerations such as the desired power output for and any size limitations of the particular device incorporating the battery. With rechargeable batteries, capacity and rate capability or the rate at which the battery receives and delivers an electrical charge is also considered. In electric vehicles or other high-power applications, both the capacity and rate capability are the major priorities because of the extended range and high charge/discharge rates demanded by these applications.

With respect to lithium ion batteries, there is a loss of capacity and rate capability because after the initial charge/discharge cycles of new batteries, there is an "initial cycle irreversibility" or a loss of 10 to 50% of available lithium ions. Thus, the initial cycle irreversibility decreases storage capacity of the battery for subsequent charges and discharges. To compensate for the initial cycle irreversibility and decrease in storage capacity, the battery size may be increased. As another option, alternate electrode systems may be used that modify the type of negative electrode in the system. However, these compensations and alternate electrode systems have shortcomings and provide technical barriers for commercialization of an optimized battery.

Current lithium-ion battery technology is based on low-energy-density carbonaceous or graphitic materials as negative electrodes and either oxide or phosphate positive electrodes. Current positive electrode materials are limited to a maximum capacity between 100-200 Ah/kg in practical lithium cells. The oxide positive electrode also reacts with the electrolyte and generates oxygen at a high state of charge through an exothermic reaction, particularly at elevated temperatures. The positive electrode decomposition impacts cell performance and may lead to battery thermal run-away. Furthermore, transition metals like cobalt and nickel used in oxide positive electrodes significantly increase cost. Further, phosphate positive electrodes have an intrinsically large band gap and, therefore, require a specialized coating (with carbon) or doping that adds to the overall cost. In addition, most oxide cathodes suffer from dissolution of transition metals such as manganese, particularly at elevated temperatures that limits their applications. Further, the oxide cathode acts as catalyst on electrolyte decomposition at high state of charge, causing increase in cell impedance.

SUMMARY

This section provides a general summary of the disclosure, and is not a comprehensive disclosure of its full scope or all of its features.

The present teachings provide a lithium-ion battery including a silicate-based positive electrode comprising flake-like Olivine structures and a carbon fiber-based negative electrode comprising a plurality of carbon nanofiber cores each having a silicon layer and a protective layer.

In other aspects, the present teachings provide methods of preparing a lithium-ion battery. A lithium silicate-based electrode including a mixed transition metal silicate to have a flake-like structure is incorporated into a battery housing. The mixed transition metal silicate has the general formula of $Li_2M(X)M'(1-X)SiO_4$, where M and M' are transition metals with various oxidation states. A carbon fiber-based electrode including a carbon nanofiber core having a silicon layer and a protective layer is incorporated into each battery cell or a battery housing.

In still other aspects, methods of operating a lithium ion battery are provided. Lithium ions are distributed in a plurality of spaces formed between flake-like silicate materials combined to form a region of a cathode (also referred to as the positive electrode). The battery is charged with a source of lithium ions, which may be from the silicate. The lithium ions are distributed through silicon-coated carbon nanofibers, thereby reducing initial cycle irreversibility of the lithium ions.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

Example embodiments will now be described more fully with reference to the accompanying drawings.

Figure 1:
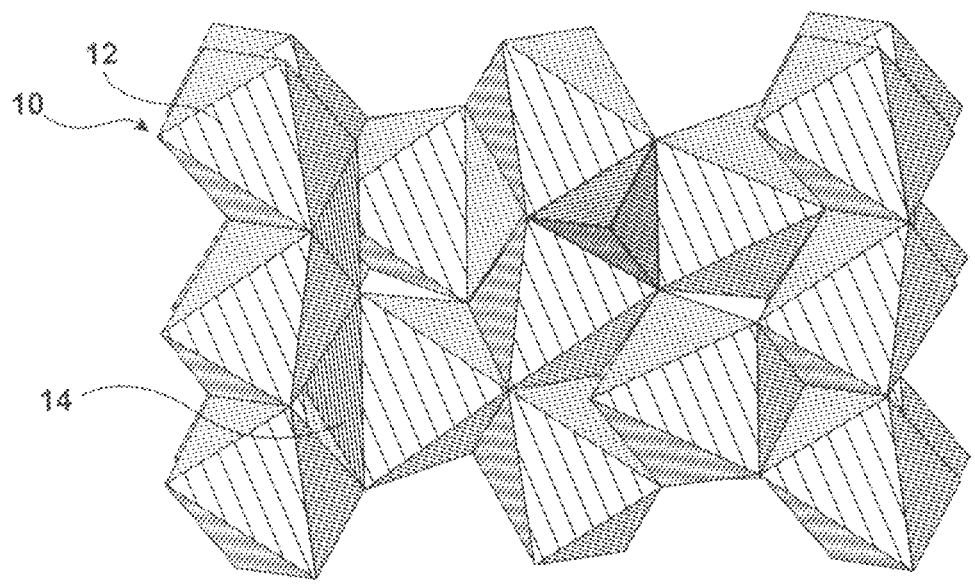
FIG. 1 depicts a lithium silicate according to various aspects of the present teachings.

With reference to FIG. 1, the present teachings generally relate to batteries having a high-energy-density lithium-transition-metal-silicate forming the first electrode (cathode or positive electrode) and a silicon-coated carbon nanofiber forming a second electrode (anode or negative electrode). The present description will detail a silicate-based cathode followed by a description of a silicon-based anode. Advantageously, the silicate-based cathode and silicon-based anode provide a lithium ion battery with improved charge/discharge rates, increased energy density, reduced costs, and facilitated use in high-energy applications such as electric vehicles.

Lithium Silicate-Based Cathode

Figure 2:
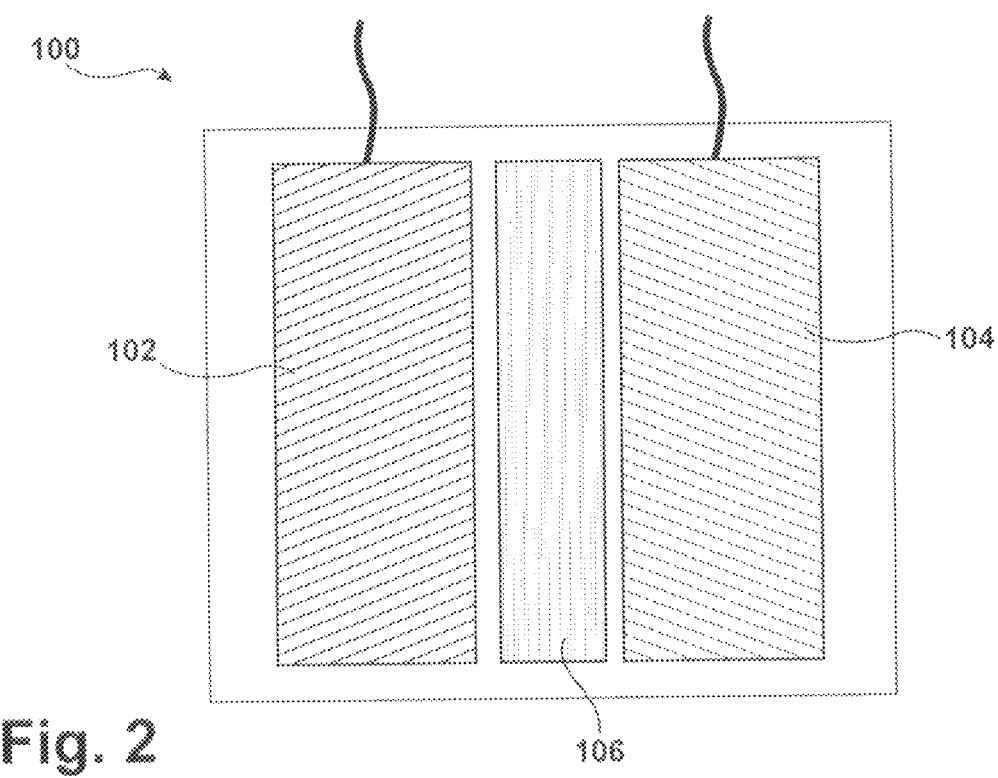
FIG. 2 depicts an exemplary battery.

In various embodiments, the lithium-transition-metal-silicates are used as part of a battery 100 as generically depicted in FIG. 2. The battery 100 includes the anode 102, a cathode 104, and a separator 106 containing electrolyte. While the battery 100 of FIG. 2 is a simplified illustration, exemplary battery systems include all lithium-based batteries. The electrode described in the present teachings can be used as a cathode in all lithium-based batteries using metallic lithium or alternative anodes such as carbonaceous and graphitic anodes, lithium alloys, silicon-based alloys, oxides, nitrides, phosphides, borides, and organic compounds.

The lithium-transition-metal-silicates of the present teachings help provide a marked increase in energy density and significant cost reduction with inherent safety, as compared with the current lithium ion technologies. This high energy storage system based on lithium-silicon-oxygen chemistry for cathodes and lithium-silicon chemistry for anodes is ideal and satisfies all requirements of the large format applications for electric-based transportation. Inherent advantages from the strong silicon-oxygen bonds of $SiO_4$ anions and their chemical and electrochemical stability are also attributes of the silicate cathodes 104 of the present teachings.

Figure 4:
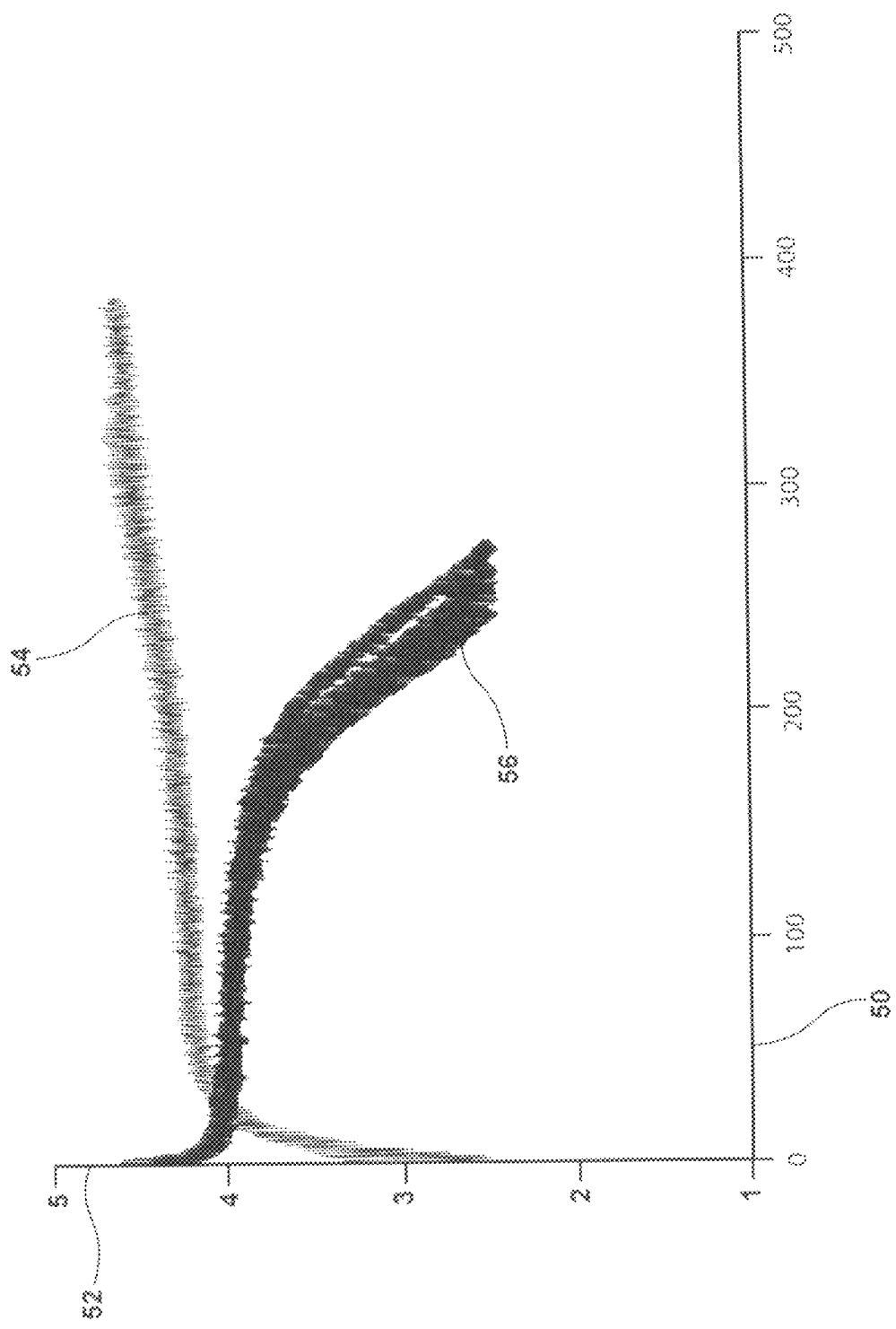
FIG. 4 depicts the voltage versus the lithium during the charge and discharge of a system according to various aspects of the present teachings.

Of the many benefits of the present teachings, notably, the instant lithium silicate cathodes 104 provide a battery chemistry with close to three times the capacity (mAh/g) of the current lithium-cobalt-oxygen ($LiCoO_2$) positive electrodes in a lithium cell. Current commercial positive electrode materials provide less than one electron per transition metal ($LiCo^{III}O_2 \leftrightarrows Li_{1/2}Co^{III/IV}O_2 + 1/2e^- + 1/2Li^+$), and are limited to less than 140 mAh/g. Silicate cathodes 104 offer two electrons/transition metal ($Li_2M^{II}SiO_4 \leftrightarrows M^{IV}SiO_4 + 2e^- + 2Li^+$) with theoretical capacity of 331 mAh/g and significantly lower cost than the current positive electrode technology. Further, it is believed that the silicate frameworks of the present teachings provide higher capacity than current phosphate-based positive electrodes such as lithium iron phosphate ($LiFePO_4$). Further lithium batteries including cathodes 104 of the present teachings have an increased voltage. In various embodiments and as shown in FIG. 4, the capacity (in mAh/g as represented by element 50 on the X-axis) reaches the theoretical value of 331 mAh/g when the voltage versus lithium is in the range of 2.5 to 4.5 (as represented by element 52 on the Y-axis). The pattern of the charge 54 and discharge 56 cycles both demonstrate the improved capacity and overall performance.

At the outset, a description of the materials is provided followed by a description of the methods of forming and using the materials.

Silicate Materials of Silicate-Based Cathode

In various embodiments, the cathode 104 includes a lithium silicate material. The basic unit of silicates ($SiO_4$) is a tetrahedron shaped anionic group that includes a central silicon ion surrounded by four oxygen atoms to provide a structure that has a total charge of negative four (−4). The charge of the silicate facilitates the subsequent bonding of the silicate anion/tetrahedron to adjacent silicate tetrahedrons or to other ions or molecules. Silicates are rock forming minerals and are found in over 90% of the rock exposed on the earth's surface. As they are abundant and readily retrievable, silicates provide a low-cost alternative to existing cathode technologies. Silicates have a lower band gap than phosphates and may provide better electrical conduction.

Silicates are further categorized into additional groups, such as the Olivine group. The Olivine group includes lithium- and/or transition-metal-containing minerals Forsterite ($Mg_2SiO_4$), Fayalite ($Fe_2SiO_4$), Tephorite ($Mn_2SiO_4$). Liebenbergite ($Ni_2SiO_4$), Cobalt-olivine ($Co_2SiO_4$), LiSc-$SiO_4$, and the like as non-limiting examples.

In various aspects, the Olivines are isolated silicate tetrahedrals having non-silicon cations in octahedral positions. As shown in FIG. 1, a generic Olivine structure having lithium ions in the M1 octahedral positions is depicted. Further, FIG. 1 shows a schematic of an Olivine structure 10 with two distinct M1 (labeled on FIG. 1 as element 12) and M2 (labeled on FIG. 1 as element 14) octahedral sites. The tetrahedral site is where the silicate anions reside. There is a site preference for ions to reside in M1 and M2. It is believed that the ion mixing between M1 and M2 is temperature dependent.

The methods of the present teachings facilitate placement of the lithium ions in the M1 octahedral positions. It is understood that although select Olivine group silicates are detailed herein, other lithium based silicates are also useful as cathodes 104 of the present teachings such as Phenacite, Willemite, and Kyanite with the $SiO_5^{-6}$, dimer $Si_2O_7^{-6}$, $SiO_3^{-2}$, and any other silicate moiety, as well as single, double, and 3-D framework, as non-limiting examples. Silicate anions that share oxygen to form chain, ring, sheets, and 3-D frameworks are abundant in nature and are distinguished from the silicate containing isolated $SiO_4^{4-}$ moiety such as Olivine silicates.

In various embodiments, the lithium ion resides in the M1 octahedral sites while a transition metal resides in M2 octahedral sites. However, ion mixing between M1 and M2 will take place based on synthesis condition and temperature. This class of compounds, with general formula ($Li_2M^{II}SiO_4$), allows extraction of two lithium ions per formula unit when the transition metal $M^{II}$ at $2^-$ oxidation state is oxidized to $M^{III}$ and $M^{IV}$. This reaction corresponds to the utilization of two electrons per transition metal, more than triple that in layered $LiMO_2$ in current lithium ion batteries such as batteries using $LiCoO_2$ and lithium nickelate-based cathodes.

While it is believed that some of the lithiated transition metal silicates are electrochemically active, there have been difficulties in creating Olivine-type structures of $M^I_2(1)M^{II}(2)SiO_4$, where $M^I$ is Lithium, the silicate tetrahedra remain isolated, and lithium ion in the M1 octahedral sites and transition metals in M2 octahedral sites of the silicate lattice. Previous attempts at synthesis using solid state, sol-gel and polyol processes have failed to create a lithium transition metal silicate with proper Olivine structure. Therefore, the reported capacity of the silicate cathode has remained low (less than about 160 mAh/g), and with poor cyclability. The theoretical calculation demonstrated that within the Olivine structure, $Li_yMXO_4$ (where X=Ge, Si, As, or P and y is the number of lithium ions) the voltage of the positive electrode is directly related to the nature of transition metal and the electronegativity of the X in $XO_4$ polyanion.

In various embodiments, mixed transition metal silicates, with general formula $Li_2(M_xM'_{1-x})SiO_4$ (where M and M' are transition metals with various oxidation states) are also potential positive electrode materials. The exchange of Fe with Mn provides iso-structural compounds with lattice symmetry. In various embodiments, the Pechini sol-gel process and solution based synthesis are suitable to prepare the mix-metal silicates. A full disclosure of the Pechini method is found in U.S. Pat. No. 3,330,697, which is incorporated herein by reference in its entirety. Other suitable methods of preparing the mix-metal silicates include microwave synthesis, hydrothermal synthesis, solid state synthesis, soft chemistry method, molten salt flux method, physical vapor deposition, chemical vapor deposition, and/or sputtering technique.

One of the major issues with Olivine silicate type synthesis has been extreme tendency of silicate anions to form chain, ring, sheets, and tunnels and agglomerate with lack of specificity in grain growth directions. The clustering of silicate tetrahedral anions to corner and edge sharing has made it difficult to make Olivine silicate with isolated silicate anions. In addition, the low electronic conductivity and agglomeration of the particles has inhibited full utilization of silicate-based positive electrodes.

Figure 3:
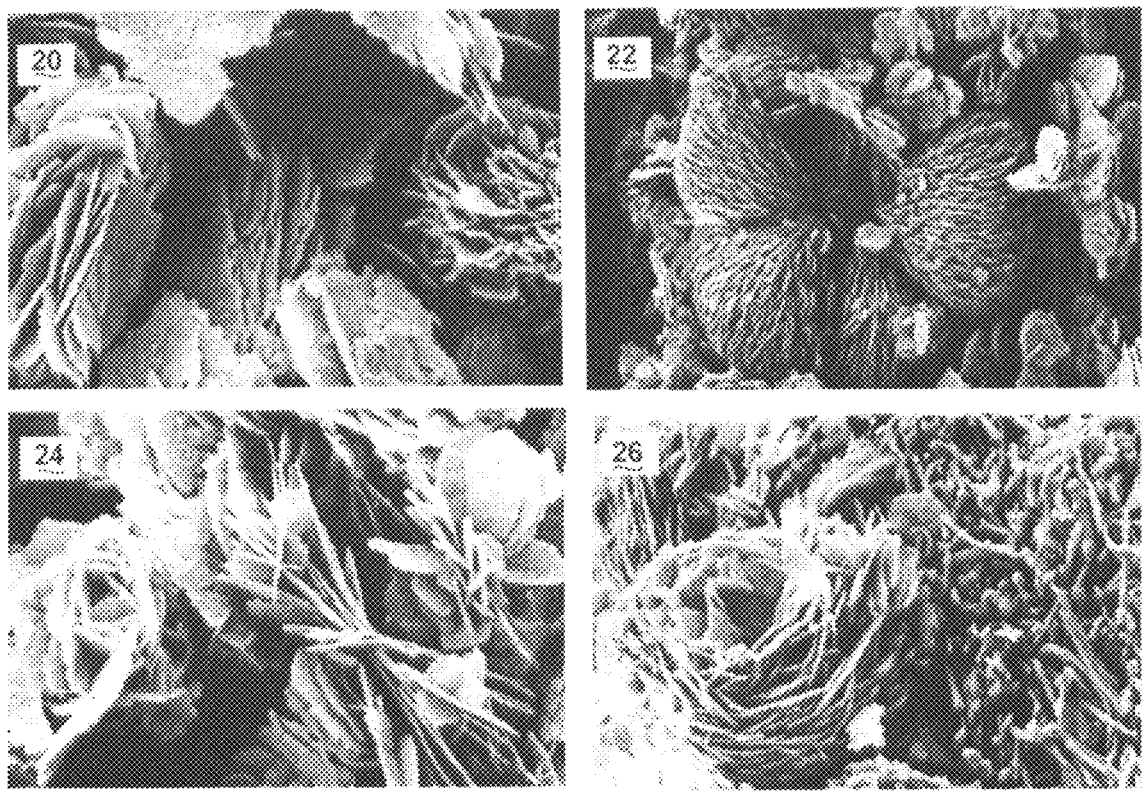
FIG. 3 depicts various flake arrangements of silicates according to various aspects of the present teachings.

With reference to FIG. 3, in various embodiments, the present teachings provide methods of producing Olivine silicates having various morphologies, including the depicted flake-like structures. It is believed that the flake-like structure maximizes surface area for the cathode 104 and thus provides the benefits detailed above herein. The maximized surface area provides greater access to a greater amount of the silicate as compared to a material that is in a granular or block form. In various embodiments, the flake-like sheets have a thickness of from about 1 to about 100 nanometers, including all sub-ranges. In still other embodiments, the flake-like sheets have a thickness of from about 2 to about 20 nanometers, including all sub-ranges. In still other embodiments, the flake-like sheets have a thickness of about 10 nanometers.

Still referring to FIG. 3, as shown at elements 20-26, the flake-like structures form distinct groups that are arranged together in close proximity. In some aspects the groups of flake-like structures are parallel to, perpendicular to, or at some other angle with respect to at least one other group of flake-like structures. In various aspects, the flakes are prepared in a direction perpendicular to the lattice b direction to expose the tunnel for easy lithium transport. In various aspects, the groups of flake-like structures are in physical contact, overlap, and/or are intertwined at a single point, at multiple points, on a single face or side, or along the entirety of the respective structures. The flake-like structures are arranged to form a plurality of stacked sheets, staggered sheets, and other shapes. The space between the sheets provides tunnels, interstices, or intricacies that facilitate passage of the ions in the silicate cathode 104 and provide the enhanced energy density and rate capability of the present teachings.

As clearly illustrated, some of the groups of flake-like structures are a flattened stack. Notably, at element 22, a plurality of clusters of the flake-like structures is combined to form almost a clover-like pattern. Turning to element 24, there are variations in the spacing between the various clusters. As best shown at element 26, in various aspects, the flake-like structures form an ornamental and arcuate shape where the flakes fan outwards from a central region. As a non-limiting example, the flake-like structures can mimic the shape of an opened or closed ordered shape of a flower, such as a rose or a more random shape, such as a feather duster. Still referencing element 26, there is a central region of the large rose-like shape that has a lower concentration of flake-like structures as compared to other regions. It is understood that the concentration of flake-like structures in any of the embodiments of the present teachings include a continuous, random, or graded concentrations of the flake-like structures across a cluster or across the entirety of the cathode 104.

Methods of Silicate Preparation and Silicate-Based Cathode Formation

To provide the flake-like shape, the present teachings provide a tailored synthesis process where lithium is substituted into a formed silicate. The indirect approach to forming the lithium-substituted silicate is needed because the shape and size of lithium hinders proper alignment of the silicate to form the desired flake-like shapes of the instant teachings.

First, a silicate is obtained or prepared having the general formula $(AB)_2SiO_4$ (where A=magnesium or barium as non-limiting examples and B=manganese, iron, cobalt, nickel, or any other transition metal, such as iron or cobalt, as non-limiting examples). The formed metal silicate is exposed to a solution containing a high concentration of lithium ions. In various embodiments, the exposure is conducted at a temperature close to the melting point of the respective lithium salts. In various aspects this is a temperature that is about +/−35% from the melting point of the respective lithium salt, including all sub-ranges. The temperature is controlled to protect the lattice system of the formed silicate. If the temperature was too high and/or if the pressure was too low, the structure might collapse or have an undesired orientation that has limited suitability for select aspects of the instant teachings.

There is an ion exchange between the element selected for position A of the formula $(AB)_2SiO_4$, and the lithium ion displaces the original ion. For example, where magnesium is used for position A, the lithium ions displace the magnesium ions, and in turn the magnesium ions precipitate or dissolve out into the ion exchange solution. In an embodiment where B is manganese and lithium is substituted for another metal, the resultant product is a single phase, pure $Li_2MnSiO_4$. An ion exchange between magnesium and lithium may be used to produce $Li_2MnSiO_4$.

In still other embodiments, the resultant lithium-transition-metal-silicate is a mixed transition metal silicate with the general formula $Li_2(M(X)M(1-X)SiO_4$, where M and M' are transition metals with various oxidation states indicated by the letter X. In various embodiments of mixed transition metal silicates that employ iron and manganese, the exchange of iron with manganese provides the iso-structural compounds with lattice symmetry. In various embodiments, a Pechini sol-gel process and solution are used to prepare the mix-metal silicates.

In other aspects of the present teachings, to form the flake-like structure, a polyalcohol process or displacement reaction with silicic acid and silicone oils is used as the media of formation. Suitable polyalcohols according to the present teachings include any material including at least two hydroxyl constituent groups. The silicone oil may include precursors containing silicon connected to four oxygen ions. It is understood that substituted and unsubstituted polyalcohols are suitable for the present teachings. Exemplary polyalcohols include glycols such as diethyl alcohol, dipropyl alcohol, butyl alcohol, and the like, as non-limiting examples. It is believed that decreasing the molecular weight of the glycols provides flake-like sheets that are smaller in at least one dimension (thickness, length, and/or width) as compared with the flake-like sheets prepared with a glycol having a higher molecular weight. It is understood that use of a combination of polyalcohol is also within the scope of the present teachings. For example, a silicate cathode 104 can be tailored to have an even greater variety between the flake-like sheets and the clusters formed from the sheets by combining different polyalcohols.

In still other embodiments, the flake-like structures are formed by compressing the lithium-containing silicate in a solid-state or under dry conditions. As detailed above, the lithium ion exchange is still conducted. Instead of using the polyalcohol to direct orientation of the sheets, mechanical techniques and apparatuses are employed.

Regardless of whether solid-state or polyalcohol formation is used, the single phase, pure $Li_2MnSiO_4$ is in the desired orientation for aspects of the present teachings. Further, the silicate sheets provide lithium diffusion tunnels that are perpendicular to the silicate sheet directions. This dramatically improves lithium transport or diffusion of lithium ions through the cathode 104.

The cathode 104 is formed by casting the flake-like sheets onto a substrate. In various embodiments, the substrate is a carbon paper. The substrate can be pre-formed in the shape of the cathode 104 or the substrate can be cut to size after the silicate is disposed thereon. In other embodiments, the silicate materials are formed into a mat with carbonaceous fibers and used without an underlying substrate. It is understood that caution is used with the materials as to not disrupt the crystalline structure of the silicates. The above-detailed benefits of the cathode are further magnified when the cathode is formed on a paper-type electrode without the use of an aluminum current collection. In various embodiments, the present teachings include forming the cathode 104 on a free-standing carbon paper coated with silicates of the present teachings. The cathode 104 is then incorporated into the appropriate battery as is known in the art.

Subsequent to formation of the flake-like sheets, the silicate sheets are coated with a conductive carbon, through gas phase reaction, to improve their rate capability. All sources of conductive carbon are suitable in various aspects of the present teachings. The elemental doping of the silicate with rare-earth elements at the level of less than 2% also has improved the electronic conductivity of the sheet silicate by 200-fold. Furthermore, common coating and doping processes used for non-conductive positive electrodes (such as carbon coating and doping with rare earth elements) are applicable to the silicate-based positive electrodes.

In summary, in various aspects, silicate-based positive electrodes were synthesized in the presence of carbonaceous particulates and conductive carbon fibers to enhance electrical conductivity. The carbonaceous materials are used as a conductive support during formation of initial silicates. Subsequent to formation of Olivine silicate, ion exchange with lithium salts was performed to prepare lithiated transition metal silicates. In various embodiments, the present teachings provide methods of preparing a silicate cathode for a lithium ion battery. An Olivine structure having a flake-like structure is prepared. The Olivine structure is coated with carbon. The Olivine structure is shaped for use as part of a cathode. In various aspects, preparing the Olivine structure having a flake-like structure further includes preparing an Olivine silicate having the structure $(AB)_2SiO_4$, where A is a metal and substituting lithium for the metal. An ion exchange is optionally performed to substitute lithium for the metal.

In select aspects, preparing the Olivine structure having a flake-like structure further includes forming the Olivine structure into sheets in the presence of at least one of silicic acid, a silicone oil, and an alcohol. The Olivine structure may be doped with from about 1% to about 2% of a rare-earth metal. In other aspects, clusters are prepared of the flake-like structures. In such aspects, the clusters are oriented to provide tunnels for lithium ion diffusion between the flake-like structures. The flake-like structures have a thickness of from about 1 nanometer to about 20 nanometers. A free standing film made of a carbon fiber paper coated with the silicate is prepared in various aspects.

In still other aspects of the present teachings, methods of preparing a silicate cathode for a lithium ion battery is provided. A mixed transition metal silicate is prepared to have a flake-like structure. The mixed transition metal silicate is coated with carbon. The mixed transition metal silicate is shaped for use as part of a cathode. The mixed transition metal silicate has the general formula of $Li_2M_xM'_{1-x}SiO_4$, where M and M' are transition metals with various oxidation states.

In various aspects, an ion mixing is conducted at the position of at least one of the transition metals M and M'. A Pechini sol-gel process and solution are used to prepare the mixed transition metal silicate in certain aspects. Another feature is that preparing the flake-like structure further includes forming the mixed transition metal silicate into sheets in the presence of at least one of an alcohol, a silicone oil, and silicic acid. In yet other aspects, the silicate is doped with from about 1% to about 2% of a rare-earth metal. In other embodiments, the sheets are formed in a direction to the lattice b direction of the silicate. In still other aspects, clusters of the flake-like structures are prepared so that they are oriented to provide tunnels for lithium ion diffusion between the flake-like structures. In still other aspects, the flake-like structures have a thickness of from about 1 nanometer to about 20 nanometers.

In yet other embodiments of the present teachings, methods of increasing voltage in a lithium ion battery are provided by distributing lithium ions in a plurality of spaces formed between flake-like silicate of various transition metals to form a region of a cathode. In certain features, a free standing film including a carbon fiber paper coated with a flake-like silicate material is prepared. Transition metals are included in the silicate in various aspects. The concentration of the transition metals is varied in other aspects.

Silicon-Based Anode

Anodes 102 of the present teachings are made of coated carbon nanofibers 210 (FIG. 5) formed of a carbon nanofiber core 212 coated with a silicon layer 214 and a silicon oxide layer 216. Anodes 102 formed according to the present teachings provide increased capacity, increased energy density, improved electrical connectivity to the electrode, and improved stability of the battery. Notably, the instant anodes 102 and related methods provide a significantly increased rate capability, provide a faster charging time, and protect the system against parasitic reactions with the electrolyte. This is particularly beneficial for lithium batteries and for high-energy applications. The anode significantly reduces the irreversible capacity loss during initial charge-discharge cycles.

Figure 5:
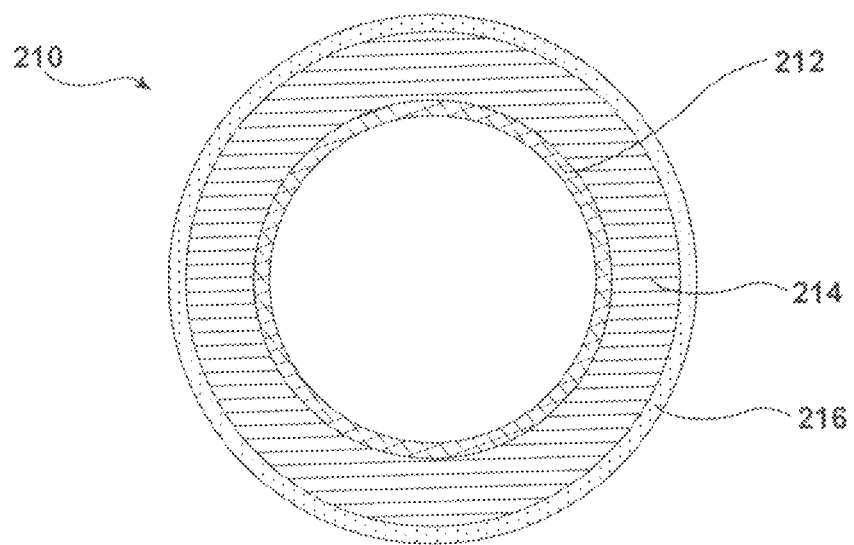
FIG. 5 depicts a coated carbon nanofiber according to various aspects of the present teachings.

A description of the materials for anode 102 is provided followed by a description of the methods of forming and using the materials. Turning to FIG. 5, the coated carbon nanofibers 210 include a carbon core 212, a silicon layer 214, and a silicon oxide layer 216. In various embodiments, the carbon core 212 has a diameter of from about 50 to about 250 nanometers. In still other embodiments, the carbon core 212 has a diameter of from 70 to 100 nanometers. The carbon core 212 is elongated and in various embodiments may have an aspect ratio of from about 200 to about 3000 (with respect to the diameter) or from about 500 to about 600, including all sub-ranges. The dimensions of the carbon nanofiber provide an increased surface area up to 50-100-fold greater than the surface area in traditional graphite materials used as electrodes.

The carbon core 212 is a hollow stacked-cone configuration with rough surface morphology that is markedly different from the smooth surface configuration of single wall carbon nanotubes (SWCNT). The stack-cone geometry facilitates cone-in-cone gliding. It is believed that the area gliding may relax the interfacial stress such that contact of the silicon on and to the carbon nanofibers will remain during alloying/de-alloying of silicon with lithium. In addition, the exposed interlayer of stacked graphene cones with silicon facilitates lithium insertion between the graphene cones to accommodate and protect the anode 102. Additional details on the carbon core 212 are provided in U.S. Patent Application Publication No. 2009/0294736 to Burton et al., which is incorporated herein by reference in its entirety.

The silicon layer 214 has a thickness of from about 20 to 70 nanometers in various embodiments. In still other embodiments, the silicon layer 214 has a thickness of from about 35 to about 50 nanometers. It is understood that the silicon layer can cover the entirety of the carbon core 212 or discrete sections of the carbon core 212. In various embodiments, the coverage is from about 10 to about 100%, including all sub-ranges. The silicon also coat the inner surface of the carbon nanofiber hollow core.

The capacity of the coated carbon nanofiber 210 is tuned by controlling the thickness of the silicon layer 214. If the silicon layer 214 is too thick, there is an inadequate cyclability or charging and discharging of the battery. Appropriate selection and preparation of the silicon layer 214 are important because of the large volume that alloys experience during incorporation and release of large amounts of lithium during charge and discharge. For example, silicon undergoes over a 300% volume expansion when fully charged. Where the silicon is particulate form, the particles may migrate or fragment as a result of the volume changes. This isolates the silicon from electrical contact with the rest of the battery 100. The net result is rapid loss of capacity upon cycling. The instant teachings utilize amorphous and open structure silicon on the carbon core 212. This prevents migration of the silicon particles and helps the system to achieve excellent cyclability.

To protect the silicon layer 214, a silicon oxide layer 216 is coated thereon. The silicon oxide layer 216 has a thickness of from 1 nanometer to 20 nanometers in various embodiments, including all sub-ranges. In still other embodiments, the silicon oxide layer 216 has a thickness of about 5 nanometers. It is understood that the silicon oxide layer 216 can cover the entirety of the silicon layer 214 or discrete regions (stripes, spots, or random pattern, as non-limiting examples) of the silicon layer 214. It is further understood that, in certain embodiments and/or depending on the coating distribution, the silicon oxide layer 216 directly contacts the carbon core 212. In various embodiments, the coverage is from about 10 to about 100%, including all sub-ranges. It is further understood that silicon oxide layer has a compositionally graded interface with silicon layer, with lower oxygen concentration at the silicon oxide/silicon interface and high oxygen concentration at the silicon/electrolyte interface.

The silicon oxide layer 216 provides better stability of the battery 100 because it prevents capacity drop during extended charge-discharge cycling and during long-time storage of the charged battery. The silicon oxide layer 216 serves as a protective layer that does not grow or substantially change in size over multiple charge and discharge cycles. The silicon oxide layer 216 of the instant teachings reduces initial cycle irreversibility to a less than about 10%. While silicon oxide is detailed in the instant disclosure as providing the above features, other protective layers such as nitrides, phosphides, borides, oxides phosphates, borates, various organics and the like are also suitable as the protective layer and may be used instead of or in addition to the silicon oxide.

Figure 7A:
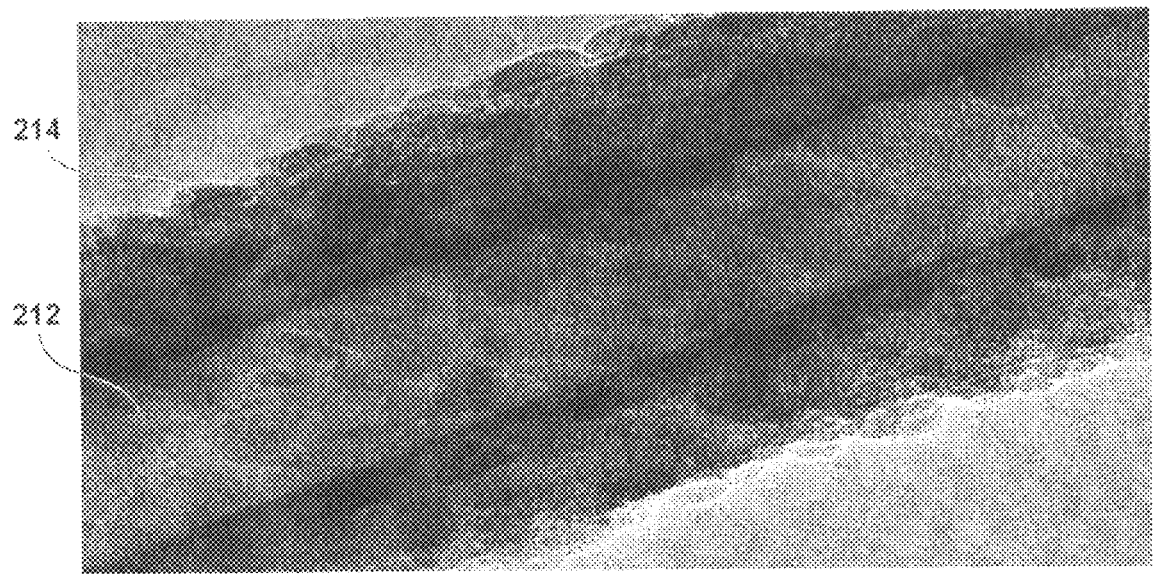
FIGS. 7A-7B depict aspects of the coated carbon nanofiber according to various aspects of the present teachings.
Figure 7B:
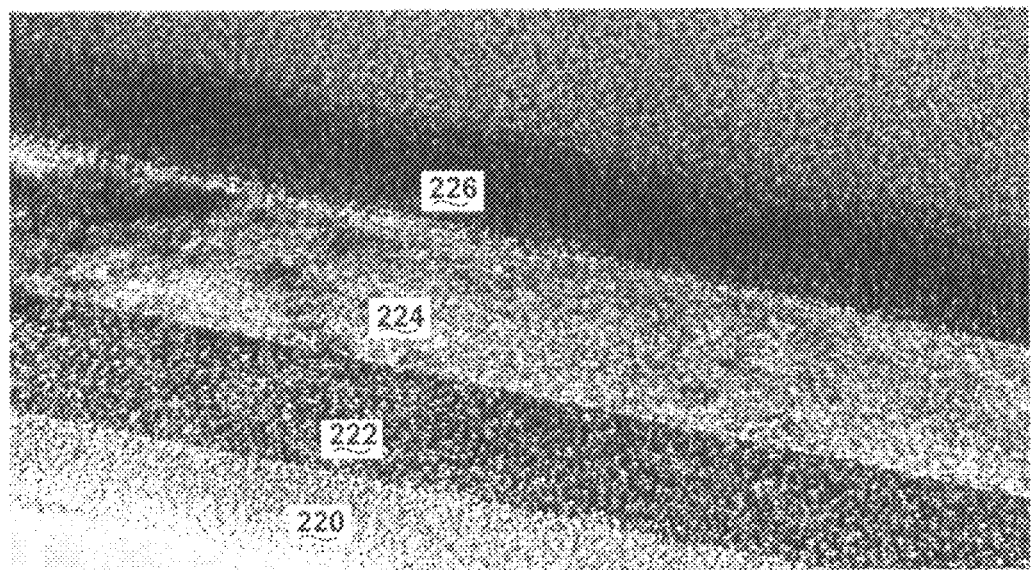

In various embodiments, and as depicted in FIG. 7B as will be detailed later herein, there is a gradient between the interfaces of some or all layers 212, 214, and 216. For example, at an outer surface of the carbon core 212, there can be a mixed interface of carbon and silicon from the silicon layer 214. As the silicon layer 214 increases in thickness, the layer no longer includes the carbon and is silicon. Similarly, at the outer surface of the silicon layer 214, there can be a mixed interface of silicon and silicon oxide from the silicon oxide layer 216. As the silicon oxide layer 216 increases in the thickness, the layer no longer includes the silicon from silicon layer 214.

This graded feature or graded interface(s) prevents cracking of the materials that would occur due to a sharp interface between the layers 212, 214, and 216. As stated above, silicon expands significantly during alloying or the lithiation process which in turn generates significant stress at the silicon and carbon nanofiber interface. The gradient reduces those stresses. The stresses are further decreased by the graded silicon oxide layer 216.

In still other embodiments, an adhesion promoting layer (not depicted) is optionally used to secure the silicon layer 214 to the carbon core 212 and/or to secure the silicon layer 214 to the silicon oxide layer 216. Exemplary adhesion promoting layers include materials that have an adequate ability to adhere to adjacent layers. The adhesion promoting layers include various metals, metal alloys, organic materials, and/or inorganic materials. In various embodiments, the adhesion promoting layers include metals, polymers, and combinations thereof. For example, in various embodiments a titanium adhesion promoting layer is used because titanium demonstrates adhesion to both carbon and silicon.

To form the coated carbon nanofiber 210, the carbon core 212 with the stack-cone configuration is heat treated in air at a temperature from about 500 to about 750 degrees C. to remove amorphous or loosely bound carbon. The heat treatment provides more graphitic fibers and also provides roughness on the carbon core 212 to better adhere the silicon layer 214. It is understood that higher surface roughness also can be achieved by other methods such as heat treating the carbon core with other reactive gases, and physical methods such as by ion milling.

Next, silicon is deposited on the prepared carbon core 212 to form the silicon layer 214. The silicon layer 214 is deposited by decomposition of a silicon starting material, such a silane or an organosilane, at a temperature of about 550 to about 750 degrees C. In various embodiments, the decomposition is achieved in a tube reactor or furnace. In various embodiments, the flow rate for the silicon is from about 50 cubic centimeters per minute to about 300 cubic centimeters per minute, including all sub-ranges. In various other embodiments, the flow rate is about 100 cubic centimeters per minute. These parameters control the amorphicity of the silicon.

In various other embodiments, the silicon layer 214 is deposited using a fluidized bed reactor. This option is useful and cost-efficient where there is a massive amount of carbon core 212 to be coated. In still other embodiments, silicon hydride is used to form the silicon layer 214. In such an embodiment, there is further cost-reduction because the excess heat generated during carbon nanofiber preparation can be used to decompose the silicon hydride. It is understood that the silicon sources listed here are non-exhaustive and other sources are within the scope of the present teachings.

To prepare the silicon oxide layer 216, air or oxygen is introduced into the flow gas used to create the silicon layer 214. The temperature in the tube reactor or furnace is from about 400 to about 750 degrees C. or from about 400 to about 650 degrees C., including all sub-ranges. The air provides a reaction on the silicon layer 214 to provide the silicon oxide material.

Optionally, in still other embodiments, an additional protective layer is used in connection with the silicon oxide layer 216. For example, there may be a pre-treatment with air, ammonia, borane, or other gaseous species and compounds to further stabilize the electrode/electrolyte interface, and improve long term charge-discharge cycling.

To prepare the anode 102 of the present teachings, the coated carbon nanofibers 210 are mixed with a binder. In various embodiments, the binder is a solid or a liquid. In still other embodiments, the binder is an elastomer. Where a dissolved liquid elastomer is used, the coated carbon nanofibers 210 and the binder form a slurry which is cast on a supporting surface, such as a copper foil or a carbon paper, as non-limiting examples. The slurry is dried and the support is cut into the desired shape of the anode 102 or the support has a pre-formed shape of the anode 102. In other embodiments, the silicon coated carbon fiber is formed in a preformed mat configuration and used in the battery 100 without a copper support. In still other embodiments, a plurality of carbon cores 212 is disposed on the support and subsequently, the silicon layer 214 and silicon oxide layer 216 are deposited thereon.

The anode 102 is incorporated into a battery 100. The battery 100 is charged with an electrolyte as the source of lithium ions. The electrolyte and lithium ions come into contact with the anode 102 to facilitate the oxidation-reduction reactions that occur at the anode 102. When the electrolyte enters the coated carbon nanofibers 210 and the battery 100 is operating, the expansion of the silicon layer 214 that occurred in previous systems is significantly mitigated by the silicon oxide layer 216 as detailed above. Surprisingly, the various methods and devices of the present teachings reduce initial cycle irreversibility by from about 10% to about 100%, including all sub-ranges, or from about 10% to about 70%, including all sub-ranges, as compared to other systems. In turn, this markedly improves the rate capability, provides high capacity, and facilitates large scale use and commercialization of systems incorporating the instant anodes 102. In various embodiments, the capacity remains relatively consistent (from about 0.1% to less than about 20% decrease, including all sub-ranges) over from 10 to 10,000 charge and discharge cycles, including all sub-ranges, as will be detailed in the Examples section.

Further, the improved performance of the instant anodes 102 is attributed to the various unique features disclosed herein, alone or in various combinations. The lithium charge storage capacity using anodes according to the present teachings is from 3 to 5 times greater than that of lithium carbon anode. This is further magnified when the coated carbon nanofiber 210 is formed on a paper-type electrode without the use of a copper current collector. In such embodiments, there is an 8- to 12-fold capacity advantage as compared to a copper current collector. By using free-standing and/or pre-formed paper electrodes, there is significant cost reduction and improvement of battery gravimetric energy density.

EXAMPLES

Silicate-based positive electrodes were synthesized using unique preparation methods to form the proper particle crystal structure, composition, size and morphology (platelet with optimized $Li^+$ diffusion pathway). Among the various silicate structures, those with proper ratios of mixed metal/$SiO_4$ ($Li_2MSiO_4$, M=mixed multi-redox transition metal centers) were synthesized to further enhance their energy storage capacity and maximize the number of redox electron exchanges and the available sites for lithium ions. The voltage profile of the silicate was tuned by proper selection of mixed transition metals, lattice parameters, and silicate anion packing density. By using a polyol process with a low cost surfactant, a single phase, pure $Li_2MnSiO_4$ with rose-flower geometry, having thin sheet layer silicate with sheet thickness of about 10 nanometers was created. The scanning electron microscopy (SEM) results favored flake-like structures.

The electrical and ionic conductivity of the silicate positive electrodes was studied at various states of lithiation using embedded four probe and blocking electrode techniques. Impurity bands close to the conduction band of the silicate were created by addition of less than 2% niobium which increased the electronic conductivity of the silicate over 220-fold. The electronic and ionic conductivity of the silicate positive electrode by doping, substitution, and coating processes was improved. Surface coatings by carbonaceous material and addition of conductivity enhancers in the electrode plates was also used to generate almost metallic type electrode with low impedance for high rate, (high power) applications.

Several synthesis processes were developed and refined for preparing lithium transition metal silicates. The solid state reaction synthesis provided a phase pure silicate with particle size in the range of 10-20 microns with a few larger particulates (60-70 microns). The crystallite sizes within the secondary particles were about 2.5 nanometers. After energetic ball milling of the sample, the secondary particle sizes were reduced to 0.1-0.2 microns. The ball milling was also performed in presence of conductive carbon, and in wet condition in xylene medium. The electrochemical performance of the materials prepared by simple solid-state reaction was measured. Some improvements on capacity and reversibility were observed after particle size reduction and application of carbon coating (120 mAh/g).

A hydrothermal synthesis was also applied, and phase pure materials for all $Li_2MSiO_4$ (M=iron (Fe), manganese (Mn), nickel (Ni), and cobalt (Co)) were prepared after ion exchange with lithium salt. The electrochemical performance of the hydrothermal samples was improved and exceeded 1.4 electrons per transition metal atom. The polyol synthesis provided the best results and gave more flexibility to adjust the morphology of the silicate products.

The polyol-based process in the presence of surfactants caused preferred directional growth to provide a flake-type morphology with preferred directional grain growth. The electrochemical performance, for the sheet like silicate with about 10 nanometer sheet thickness, improved to over 1.7 electrons per transition metals after carbon coating.

Referring to FIG. 3, the morphology of $Li_2MnSiO_4$ prepared using different surfactant in polyol synthesis method is depicted. The flake-like sheets had proper orientation to facilitate lithium transport in and out of the 1-D tunnel of lithium transition metal silicates. The capacity of samples shown at element 22 were improved from 167 mAh/g for a-type sample to 293 mAh/g.

With respect to the silicon-based anode, improvements in the retention of the reversible capacity were achieved through refinements in the deposition process. Scanning electron microscopy (SEM), high-resolution transmission electron microscopy (HRTEM), and x-ray diffraction (XRD) examinations of negative electrode materials according to the present teachings revealed that the benefits of coating an amorphous silicon with nanoscale thickness. Closer examination revealed that the best performing electrodes were bonded to the carbon substrate through a graded interface where the ratio of carbon and silicon gradually changes from carbon nanofiber substrate to the surface of the coating. There is evidence that the graded interface creates a robust bonding to withstand severe expansions and contractions of the silicon as it undergoes lithiation and de-lithiation. Evidence of this behavior is revealed in transmission electron microscopy (TEM) analysis of the silicon coated carbon nanofiber 210 after 100 cycles.

Figure 6A:
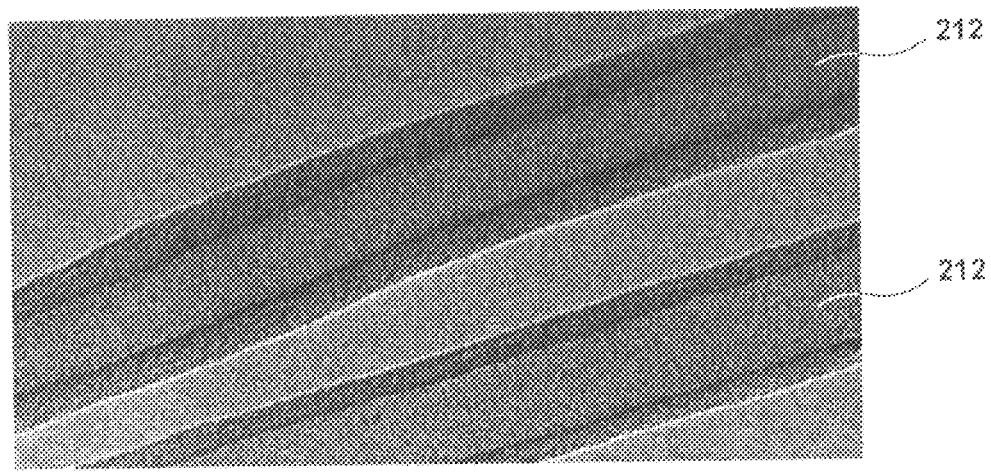
FIGS. 6A-6C depict a process of coating a carbon nanofiber according to various aspects of the present teachings.
Figure 6B:
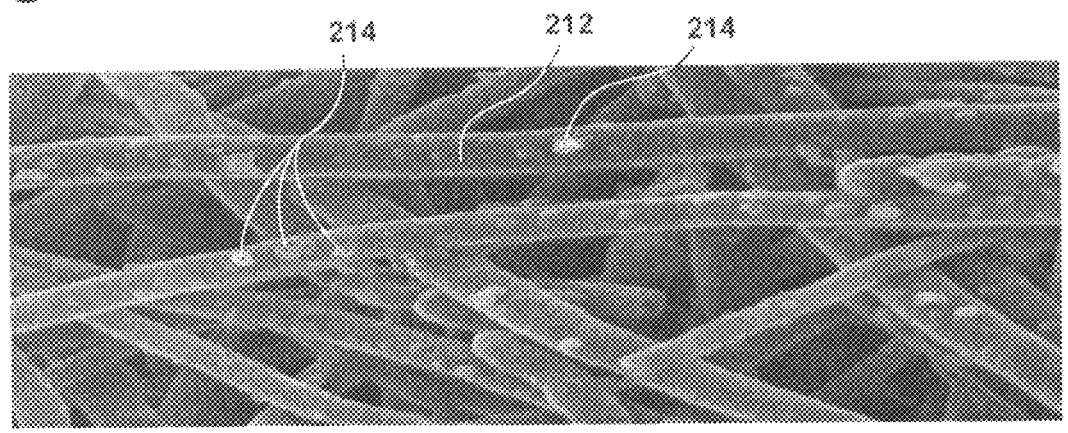
Figure 6C:

FIG. 6A shows a TEM micrograph of baseline carbon nanofiber 212 prior to silicon coating. As shown in FIGS. 6B and 6C, SEM and TEM micrographs show nanoscale amorphous silicon attached to the surface of electrically conductive carbon nanofiber. At low loadings, as shown in FIG. 6B, the silicon 214 is deposited as small islands or nodules on the surface of the nanofiber. At higher loadings, the silicon is deposited in a manner which produces a high surface area coating for rapid lithiation/de-lithiation for higher power capability, which is shown in FIG. 6C. The figure shows the higher resolution TEM of a single strand of the silicon carbon nanofiber composite.

FIG. 7A shows the HRTEM images of silicon-carbon negative electrode alloy materials made of the coated carbon nanofibers 210. FIG. 7B shows an end-on view of the resulting ring structure. The wall of hollow and coated carbon nanofiber 210 has a compositionally graded nanostructure that is useful for adhering silicon. As shown, there is a presence of silicon (labeled element 220), silicon carbide (labeled element 222), carbon with low amounts of silicon (labeled element 224), and carbon (labeled element 226).

Figure 8A:
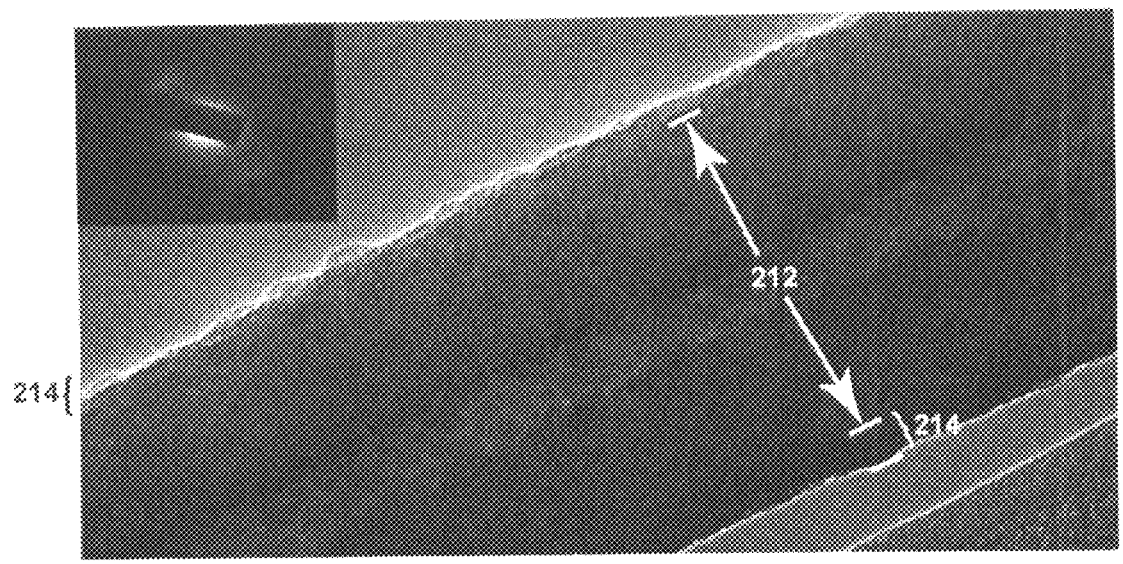
FIGS. 8A and 8B depict silicon modification before and after charge and discharge cycles, respectively, according to various aspects of the present teachings.
Figure 8B:
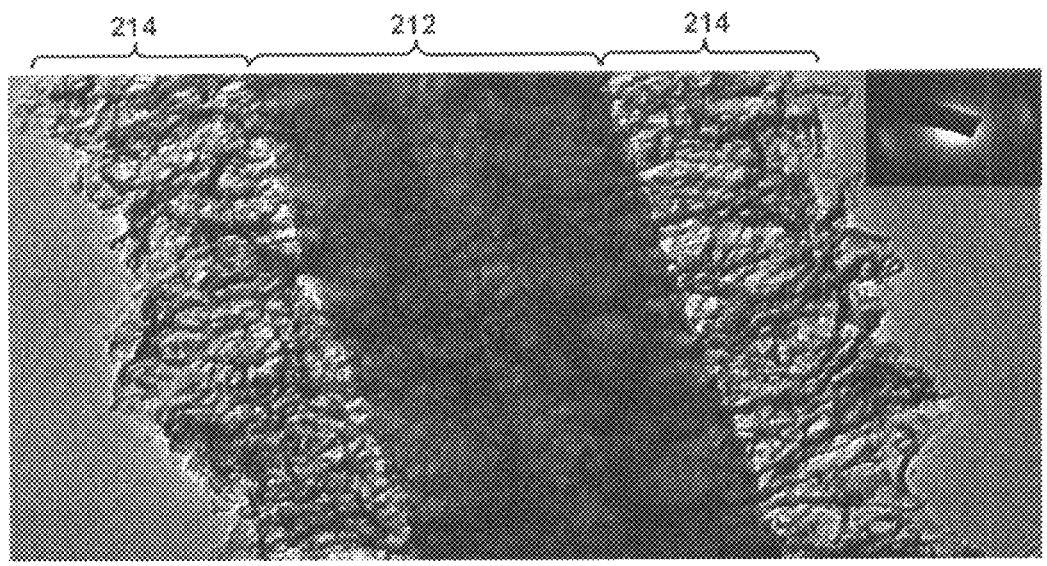

FIG. 8A shows a TEM image of coated carbon nanofiber 210 having a thin layer of silicon prior to electrochemical cycling. FIG. 8B shows a TEM image of silicon coating after 100 electrochemical deep charge-discharge cycles. The coated nanofiber 210 at FIG. 8B has a scale of 2.5-fold greater than the scale of FIG. 8A. In other words, the scale for FIG. 8A was 20 nanometers per unit measurement while the scale for FIG. 8B was 50 nanometers per unit of measurement. These images clearly show that the silicon has expanded but is still chemically bonded, and electrically connected, to the carbon nanofiber after 100 charging/discharging events.

Figure 9:
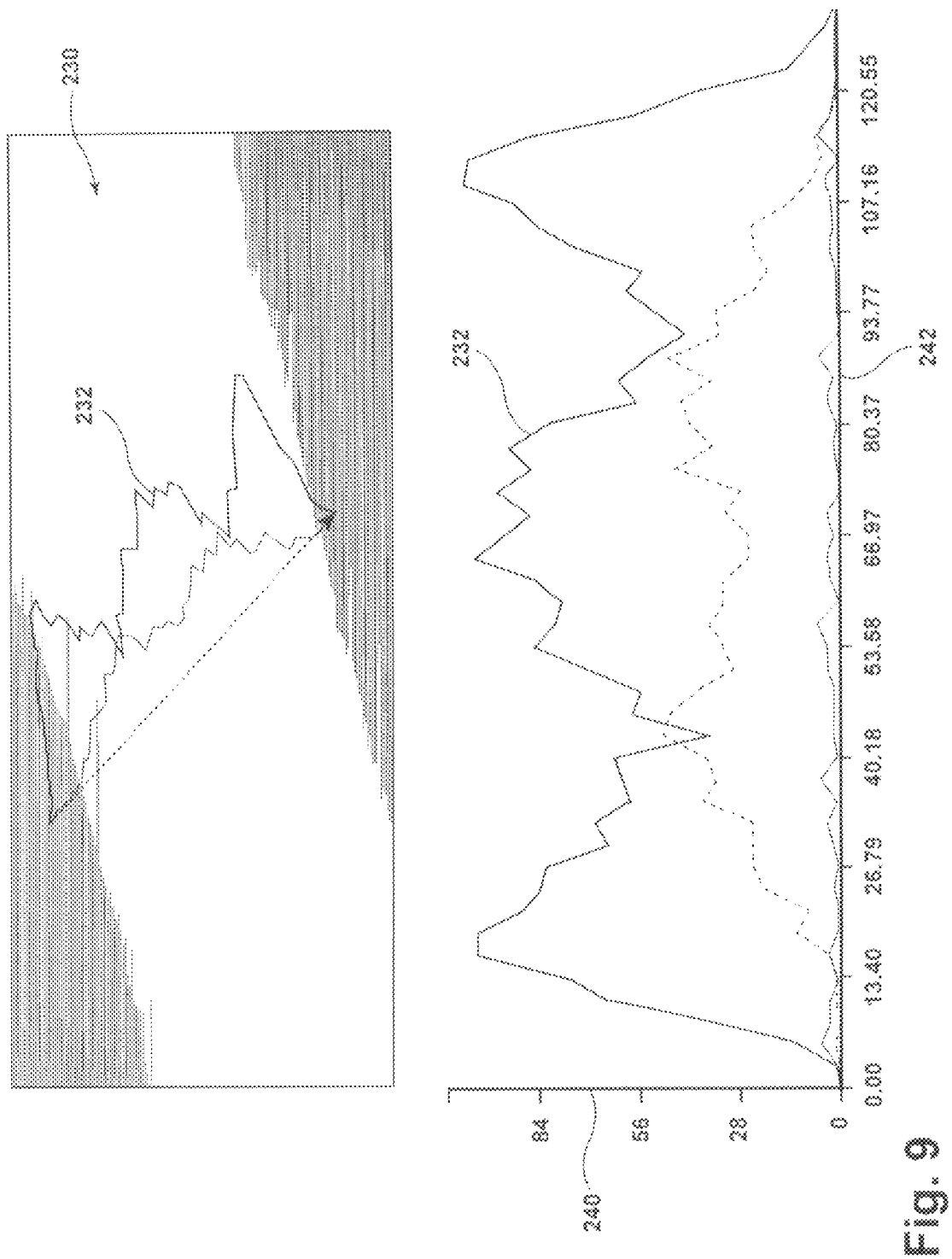
FIG. 9 depicts images of the relative silicon concentration on a coated nanofiber according to various aspects of the present teachings.

FIG. 9 provides a TEM (labeled 230) image and an energy dispersive x-ray spectroscopy (EDS) (labeled 232) line scan showing the relative concentration of carbon and silicon of silicon coated carbon nanofiber 210 sample. The EDS performed on the silicon-coated carbon nanofiber 210 supports the high resolution TEM and SEM microscopy results which indicated the presence of the silicon on the interior surface of the carbon nanofiber 212. The EDS line scans on the cross section of the coated carbon nanofiber reveal that the silicon concentration is highest at the midpoint of the scan. This result indicates that the silicon is deposited on the interior and exterior of the nanofiber. As shown in FIG. 9, similar lines scans performed on a sample of cycled silicon coated carbon nanofiber reveal that the silicon deposited along and within the width of the carbon nanofiber (represented in nanometers on the X-axis labeled element 242) is still present after 100 charge—discharge cycles (represented on the Y-axis labeled element 240).

Figure 10:
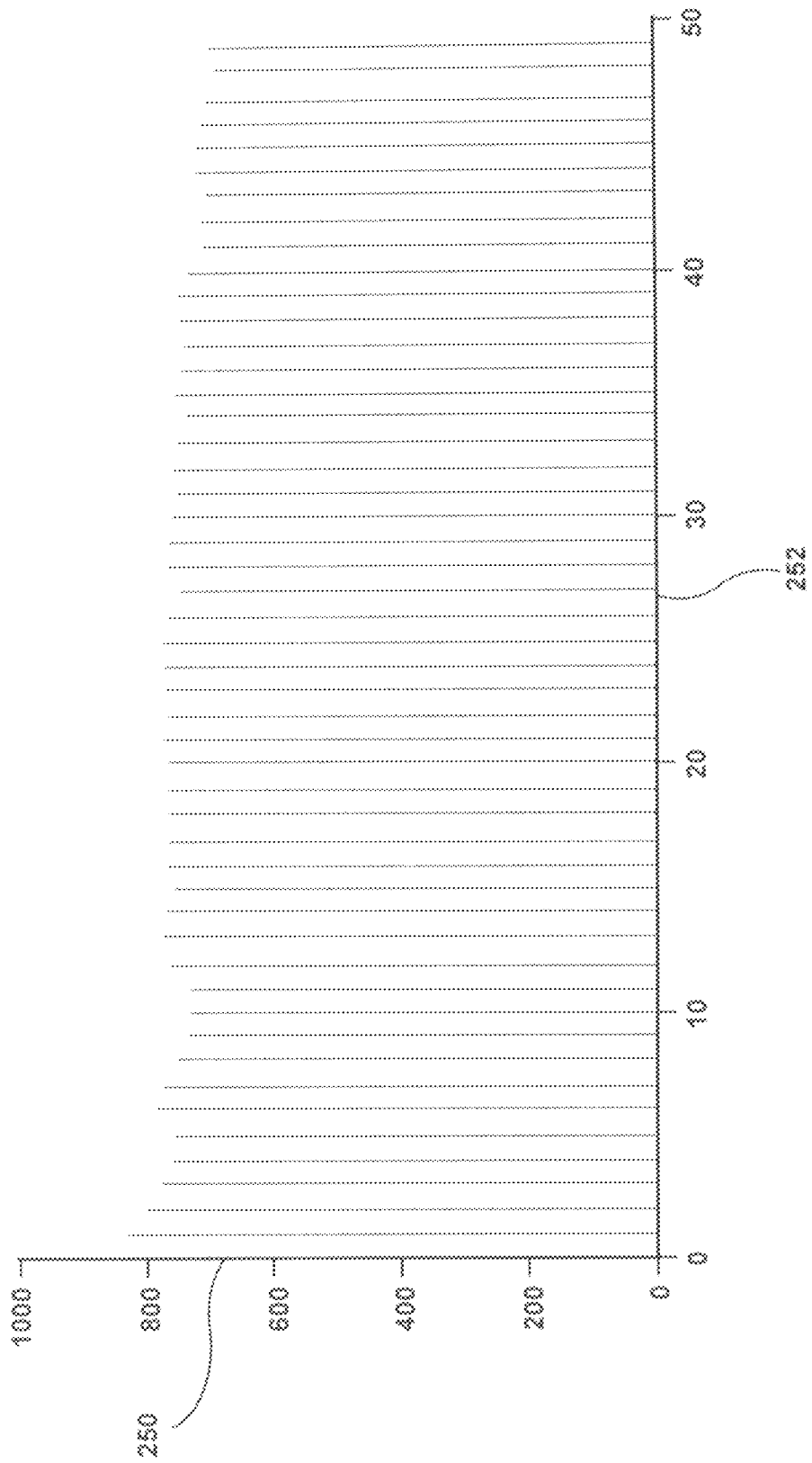
FIG. 10 depicts the energy capacity of silicon-coated nano fibers according to various aspects of the present teachings.
Figure 11:
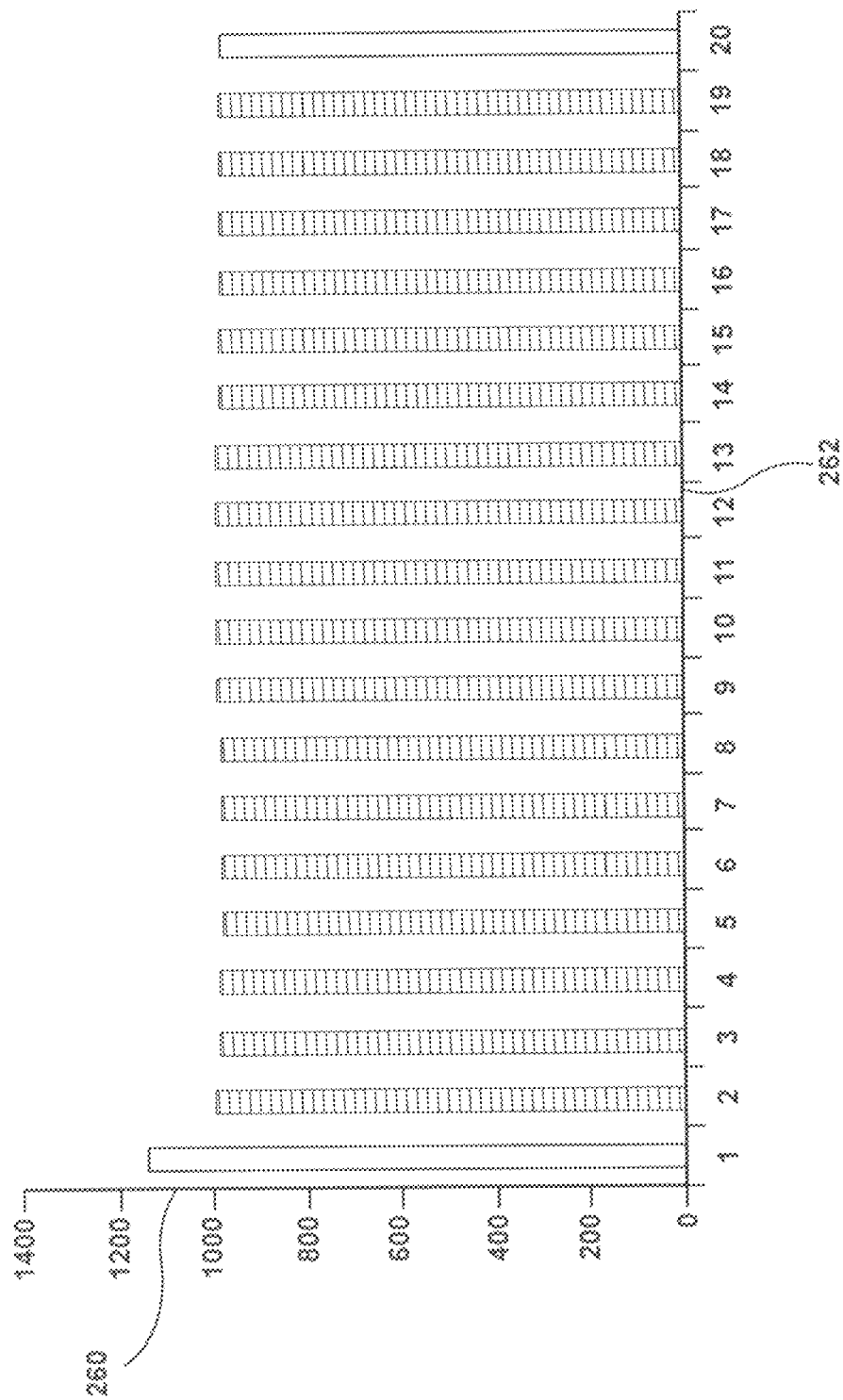
FIG. 11 depicts the cycling efficiency according to various aspects of the present teachings.

Turning to FIGS. 10 and 11, composite negative electrodes manufactured at the laboratory scale showed exceptionally high energy capacities of 1000 to 1200 mAh/g (represented on the Y-axis labeled elements 250 and 260, respectively) and excellent cycling efficiencies (represented by the number of cycles shown on the X-axis labeled elements 252 and 262, respectively). The cycling efficiency of the silicon and carbon nanofiber composite negative electrode was further enhanced when cycled in a full cell configuration against conventional positive electrodes or cathodes.

The composite negative electrode samples were produced with a high level of reproducibility and specific capacity. The cycling efficiency is improved through modifications in reactor parameters during silicon deposition and surface treatment of the deposited silicon. Quality control methods were introduced and refined to ensure consistent quality from batch to batch. As illustrated in FIGS. 10 and 11, negative electrode powders including nanoscaled fibers exhibited excellent capacity retention and very low irreversible capacity during first cycle.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A lithium-ion battery comprising:
   a lithium silicate-based electrode comprising flake-shaped Olivine silicate structures;
   a separator containing electrolyte and separating said lithium silicate-based electrode and a carbon fiber-based electrode; and
   the carbon fiber-based electrode comprising a plurality of carbon nanofiber cores each having a silicon layer coated with a protective layer that protects the silicon layer and carbon nanofiber cores from contact with the electrolyte.

2. The lithium-ion battery of claim 1, wherein the flake-shaped Olivine silicate structures are in clusters.

3. The lithium-ion battery of claim 2, further wherein the flake-shaped Olivine silicate structures form sheets oriented in a direction perpendicular to a lattice b direction of each Olivine silicate structure and further wherein the clusters provide tunnels for lithium ion diffusion between each of the flake-shaped Olivine silicate structures.

4. The lithium-ion battery of claim 1, wherein the flake-shaped Olivine silicate structures are coated on a carbon fiber paper to form a free standing film.

5. The lithium-ion battery of claim 1, wherein the carbon fiber-based electrode further comprises a first gradient at an interface between the carbon nanofiber and the silicon layer, and a second gradient at an interface between the silicon layer and the protective layer.

6. The lithium-ion battery of claim 1, wherein the protective layer is a material selected from the group consisting of a silicon oxide, a nitride, a phosphides, a boride, a phosphate, a borate, organic compounds, carbonaceous materials, and combinations thereof.

7. The lithium-ion battery of claim 1, wherein the protective layer comprises silicon oxide.

8. The lithium-ion battery of claim 7, wherein the silicon oxide protective layer restricts expansion of the silicon layer.

9. The lithium-ion battery of claim 1, wherein a substrate for the carbon fiber-based electrode is a carbon fiber paper.

10. The lithium-ion battery of claim 1, wherein a substrate for the carbon fiber-based electrode and a substrate for the silicate-based electrode is a carbon fiber paper.

11. A lithium-ion battery comprising:
 a lithium silicate-based electrode comprising sheets of Olivine silicate, each having a thickness of from about 1 to about 100 nanometers;
 a carbon fiber-based electrode comprising a plurality of carbon nanofiber cores each having a silicon layer coated with a protective layer that protects the silicon layer and carbon nanofiber cores from contact with the electrolyte; and
 a separator containing electrolyte and separating said lithium silicate-based electrode and said carbon fiber-based electrode.

12. The lithium-ion battery of claim 11, wherein the sheets of Olivine silicate are in clusters.

13. The lithium-ion battery of claim 12, further wherein the sheets of Olivine silicate are oriented in a direction perpendicular to a lattice b direction of each Olivine silicate and further wherein the clusters provide tunnels for lithium ion diffusion between the sheets.

14. The lithium-ion battery of claim 11, wherein the sheets of Olivine silicate are coated on a carbon fiber paper to form a free standing film.

15. The lithium-ion battery of claim 11, wherein the carbon fiber-based electrode further comprises a first gradient at an interface between the carbon nanofiber and the silicon layer, and a second gradient at an interface between the silicon layer and the protective layer.

16. The lithium-ion battery of claim 11, wherein the protective layer is a material selected from the group consisting of a silicon oxide, a nitride, a phosphides, a boride, a phosphate, a borate, organic compounds, carbonaceous materials, and combinations thereof.

17. The lithium-ion battery of claim 11, wherein the protective layer comprises silicon oxide.

18. The lithium-ion battery of claim 17, wherein the silicon oxide protective layer restricts expansion of the silicon layer.

19. The lithium-ion battery of claim 11, wherein a substrate for the carbon fiber-based electrode is a carbon fiber paper.

20. The lithium-ion battery of claim 11, wherein a substrate for the carbon fiber-based electrode and a substrate for the silicate-based electrode is a carbon fiber paper.

* * * * *